United States Patent [19]
Nakamura et al.

[11] Patent Number: 5,869,187
[45] Date of Patent: Feb. 9, 1999

[54] DEFOGGING ARTICLE AND METHOD OF PRODUCING SAME

[75] Inventors: Ichiro Nakamura, Nishioji; Yasuaki Kai, Yokohama; Satoko Sugawara, Yokosuka, all of Japan

[73] Assignee: Nissan Motor Co., Ltd., Yokohama, Japan

[21] Appl. No.: 807,035

[22] Filed: Feb. 28, 1997

[30] Foreign Application Priority Data

Mar. 7, 1996 [JP] Japan ................................ 8-049887

[51] Int. Cl.$^6$ ........................................ B32B 17/06
[52] U.S. Cl. ..................... 428/428; 428/432; 428/697; 428/699; 428/701; 428/702; 428/472; 427/162; 427/164; 427/372.2; 427/375; 427/376.1; 427/376.2
[58] Field of Search ................... 428/457, 469, 428/472, 428, 432, 697, 699, 701, 702; 427/164, 162, 372.2, 375, 376.1, 376.2

[56] References Cited

U.S. PATENT DOCUMENTS

| | | | |
|---|---|---|---|
| 4,160,061 | 7/1979 | Okino et al. | 428/432 |
| 4,214,908 | 7/1980 | Deguchi et al. | 106/13 |
| 4,415,233 | 11/1983 | Itoh et al. | 350/164 |
| 5,073,451 | 12/1991 | Iida et al. | 428/432 |
| 5,318,830 | 6/1994 | Takamatsu etal. | 428/697 |
| 5,480,722 | 1/1996 | Tomonaga et al. | 428/428 |
| 5,496,621 | 3/1996 | Makita et al. | 428/432 |
| 5,520,996 | 5/1996 | Balian et al. | 428/702 |
| 5,525,406 | 6/1996 | Goodman et al. | 428/701 |

FOREIGN PATENT DOCUMENTS

| | | |
|---|---|---|
| 52-101680 | 8/1977 | Japan . |
| 55-154351 | 12/1980 | Japan . |
| 2 015 989 | 9/1979 | United Kingdom . |
| 96/29375 | 9/1996 | WIPO . |

*Primary Examiner*—A. A. Turner
*Attorney, Agent, or Firm*—Foley & Lardner

[57] ABSTRACT

A defogging article having a defogging coating formed on a substrate such as a glass plate, a mirror, a metal article, or a plastic article. The defogging coating includes titania, and at least one oxide selected from the group consisting of $P_2O_5$, $B_2O_3$, boehmite, $\gamma$-$Al_2O_3$, and $SiO_2$—$Al_2O_3$ based oxide. The defogging coating contains the at least one oxide other than titania, in an amount ranging from 0.1 to 50% by weight.

13 Claims, No Drawings

DEFOGGING ARTICLE AND METHOD OF PRODUCING SAME

BACKGROUND OF THE INVENTION

1. Field of the Invention

This invention relates to improvements in a defogging article having a defogging ability and a method of producing the same, and more particularly to the improvements for long maintaining the defogging ability of a defogging coating formed on a substrate such as a glass plate, a mirror, a metal article and a plastic article.

2. Description of the Prior Art

Inorganic glass and the like has been hitherto extensively used as the material of glass articles such as windowpanes, mirrors, and lenses of spectacles (glasses) by virtue of transparency thereof. However, these transparent glass articles unavoidably cause dew condensation when used at a high temperature and humidity place or at a border of places largely different in temperature and humidity, so that the surface of the articles is clouded with condensed dew.

It is a particularly serious problem that the windowpanes, the lenses of spectacles, the mirrors and the like are clouded with condensed dew and tends to easily scratch. Accordingly, improvements to solve the serious problem have been eagerly desired in a variety of fields. In view of this, a variety of proposals have been made to provide a defogging ability and a durability to the articles including a transparent material such as glass.

For example, in order to prevent the surface of a glass plate or the like from being clouded, a proposal has been made in which a hydrophilic coating is formed on the surface of the glass plate or the like. In this regard, it has been known as a simplest way from old times that the glass or the like can be prevented from being clouded by coating a surface active agent on the surface thereof. The proposal is to blend a water-soluble polymer such as polyacrylic acid or polyvinyl alcohol with the surface active agent thereby trying to improve the continuation of a defogging ability, as disclosed in Japanese Patent Provisional Publication No. 52-101680. However, this proposal can provide only a temporary defogging ability and therefore it is impossible to expect a continuous defogging ability.

Japanese Patent Provisional Publication No. 55-154351 discloses a proposal to form a hydrophilic coating having a defogging ability on the surface of a glass plate by physical deposition, chemical deposition or the like. The hydrophilic coating includes phosphate and at least one of molybdenum oxide and tungsten oxide. Additionally, Japanese Patent Provisional Publication No. 54-105120 discloses a proposal to provide a defogging ability to a glass containing $P_2O_5$ by contacting liquid or vapor of $P_2O_5$ to the glass. Further, Japanese Patent Provisional Publication No. 53-58492 discloses forming a defogging coating which is high in adhesion, by coating on a substrate a composition including sulfonic acid type ampholytic surfactant and inorganic salt or acetate, in the form of a lower-alcoholic solution.

However, difficulties have been encountered in the above discussed proposals, in which the defogging ability cannot be long maintained in any defogging coatings. Additionally, the defogging coatings of the above proposals are lower in weatherability thereby shortening the life of the defogging coating.

SUMMARY OF THE INVENTION

It is an object of the present invention to provide an improved defogging article having a defogging coating which can overcome difficulties encountered in conventional defogging coatings formed on substrates.

Another object of the present invention is to provide an improved defogging article having a defogging coating which has a high initial defogging ability and can long maintain a high defogging ability.

A further object of the present invention is to provide an improved defogging article having a defogging coating which is high in weatherabilty so as to be durable in use.

A first aspect of the present invention resides in a defogging article comprising a substrate. A defogging coating is formed on a surface of the substrate. The defogging coating includes titania, and at least one oxide selected from the group consisting of $P_2O_5$, $B_2O_3$, boehmite, $\gamma$-$Al_2O_3$, and $SiO_2$—$Al_2O_3$ based oxide. The defogging coating contains the at least one oxide other than titania, in an amount ranging from 0.1 to 50% by weight.

A second aspect of the present invention resides in a defogging glass plate comprising a glass plate. A defogging coating is formed on a surface of the glass plate. The defogging coating includes titania, and at least one oxide selected from the group consisting of $P_2O_5$, $B_2O_3$, boehmite, $\gamma$-$Al_2O_3$, and $SiO_2$—$Al_2O_3$ based oxide, the defogging coating containing the at least one oxide other than titania, in an amount ranging from 0.1 to 50% by weight.

A third aspect of the present invention resides in a method of producing a defogging article, comprising the following steps: (a) coating liquid containing titania and one compound which corresponds to at least one oxide selected from the group consisting of $P_2O_5$, $B_2O_3$, boehmite, $\gamma$-$Al_2O_3$, and $SiO_2$—$Al_2O_3$ based oxide upon being fired, on a surface of a substrate to form a coating layer. The liquid coating step includes controlling amount of the titania and the at least one compound such that the at least one oxide other than the titania is contained in a defogging coating, in an amount of 0.1 to 50% by weight upon being fired ; and (b) firing the coating layer at a temperature ranging from 300° to 850° C. to form the defogging coating on the substrate.

A fourth aspect of the present invention resides in a method of producing a defogging article, comprising the following steps: (a) preparing a sol containing titania and one compound which corresponds to at least one oxide selected from the group consisting of $P_2O_5$, $B_2O_3$, boehmite, $\gamma$-$Al_2O_3$, and $SiO_2$—$Al_2O_3$ based oxide upon being fired. The sol preparing step includes controlling amount of the titania and the at least one compound such that the at least one oxide other than the titania is contained in a defogging coating, in an amount of 0.1 to 50% by weight upon being fired ; (b) coating the sol on a surface of a substrate; (c) firing the coating layer at a temperature ranging from 300° to 850° C. to form the defogging coating on the substrate.

A fifth aspect of the present invention resides in a method of producing a defogging glass plate, comprising the following steps: (a) coating liquid containing titania and one compound which corresponds to at least one oxide selected from the group consisting of $P_2O_5$, $B_2O_3$, boehmite, $\gamma$-$Al_2O_3$ and $SiO_2$—$Al_2O_3$ based oxide upon being fired, on a surface of a glass plate to form a coating layer. The liquid coating step includes controlling amount of the titania and the at least one compound such that at least one oxide other than the titania is contained in a defogging coating, in an amount of 0.1 to 50% by weight upon being fired ; and (b) firing the coating layer at a temperature ranging from 300° to 850° C. to form the defogging coating on the glass plate.

According to the aspects of the present invention, the defogging coating has a high initial defogging ability and can long maintains its high defogging ability by virtue of its high weatherability. Additionally, the defogging coating exhibits a photocatalyst function thereby preventing contamination thereof even upon attachment of dirt thereon.

DETAILED DESCRIPTION OF THE INVENTION

According to the present invention, a defogging article comprising a substrate, and a defogging coating formed on a surface of the substrate plate. The defogging coating includes titania, and at least one oxide selected from the group consisting of $P_2O_5$, $B_2O_3$, boehmite (AlO(OH)), $\gamma$-$Al_2O_3$, and $SiO_2$—$Al_2O_3$ based oxide. The defogging coating contains the at least one oxide other than titania, in an amount ranging from 0.1 to 50% by weight.

Titania is used as a part of the defogging coating for the following reasons: Even if dirt is attached onto the surface of the defogging coating so as to degrade the defogging ability of the coating, titania absorbs ultraviolet ray having a wavelength not higher than 400 nm and produces electrons and positive holes thereby making oxidation and reduction. As a result, the dirt is decomposed so as to maintain the defogging ability of the coating. Thus, titania serves as a photocatalyst. In order to improve the quantum efficiency of the photocatalyst, it is preferable that metal or electrically conductive metal oxide is contained in or carried on the surface of the defogging coating. The metal is at least one selected from the group consisting of gold, silver, copper, zinc, platinum, palladium, rhodium, vanadium, chromium, manganese, iron, cobalt, ruthenium, nickel, niobium and tin. The electrically conductive metal oxide is at least one selected from the group consisting of $SnO_2$, ZnO, $WO_3$ and ITO (indium-tin oxide).

$P_2O_5$, $B_2O_3$, boehmite, $\gamma$-$Al_2O_3$ and/or $SiO_2$—$Al_2O_3$ based oxide are contained in the defogging coating for the following reasons: Even if the defogging ability by titania is degraded with dirt or the like attached to the titania under a condition where the amount of irradiation of ultraviolet ray is small, e.g., in night, inside a room, or in rainy weather, $P_2O_5$, $B_2O_3$, boehmite, $\gamma$-$Al_2O_3$ and $SiO_2$—$Al_2O_3$ based oxide are high in wettability to water and therefore the defogging coating can be prevented from lowering in defogging ability. These oxides are contained in the defogging coating, in an amount ranging from 0.1 to 50% by weight. If the amount is not more than 0.1% by weight, there is no effect of addition of these oxides. If the amount is not less than 50% by weight, weatherability of the defogging coating is degraded. It is preferable that the composition of $SiO_2$—$Al_2O_3$ is such that the content of $Al_2O_3$ is within a range of from 15 to 40% by weight relative to $SiO_2$—$Al_2O_3$. If this content is out of the range, the wettability of the defogging coating to water is degraded.

The defogging coating may contain a variety of oxides other than titania and the above-listed oxides including alkali metal oxides. Examples of such oxides are iron titanate, iron oxide, bismuth oxide, molybdenum oxide, nickel oxide, silica, yttrium oxide, manganese oxide, cobalt oxide, copper oxide, chromium oxide, and zirconium oxide. At least one of these oxides is optionally contained in the defogging coating as occasion demands.

It is preferable that an intermediate layer formed of metal oxide is disposed at the interface between the defogging coating and the substrate. This intermediate layer can prevent elements in the substrate from diffusing into the defogging coating thereby preventing the quantum efficiency of photocatalyst from lowering. Additionally, this intermediate layer provides the effect of improving adhesion of the defogging coating to the substrate. The intermediate layer is made of or contains $SiO_2$, $TiO_2$, $ZrO_2$, $Al_2O_3$, $SnO_2$ and ITO (indium-tin oxide) and/or ZnO. This intermediate layer is formed by selectively using known processes such as sol-gel process, vacuum deposition process, sputtering process, CVD process and metal plating process.

The defogging coating of the present invention is formed as follows: Titania sol and an oxide sol containing $P_2O_5$, $B_2O_3$, boehmite, $\gamma$-$Al_2O_3$ and/or $SiO_2$—$Al_2O_3$ based oxide are mixed to prepare a composite sol. The composite sol is coated on the surface of the substrate and fired at 300° to 850° C. Setting the firing temperature at 300° to 850° C. can cause anatase structure of the titania to be formed, the anatase structure tending to exhibit a photocatalyst function. The titania tends to take amorphous structure in case that firing temperature is lower than 300° C. while tends to take rutile structure in case that the firing temperature exceeds 850° C. The photocatalyst function of the titania of both the amorphous and rutile structures is lowered.

While the titania and other oxides in the defogging coating have been described as being resulted from the sols of the oxides, it will be understood that the sols of the oxides may be replaced with sols of other known salts, for example, sulfate, nitrate, carbonate, ammonium salt, halide such as chloride and bromide, and organic salt such as stearate and acetate, in which at least one of these salts is suitably selected as the starting material of the sols. In other words, the salts serves as the starting material of the sol. A metal alkoxide is also used as the starting materials of the sol. It will be understood that the sols to be applied to the substrate during production of the defogging coating may be a mixed sol which contains different salts of the above-listed salts.

The sols to be applied to the substrate may be ones available on the market. Specifically, the titania sol is available as TA-10, TA-15 (the trade name of Nissan Chemical Industries, Ltd.), Atron TiN (the trade name of Nippon Soda Co., Ltd.), and the like. The alumina sol is available as Alumina sol-100, Alumina sol-200, Alumina sol-520 (the trade name of Nissan Chemical Industries, Ltd.), AS-3 (the trade name of Catalyst & Chemicals Ind. Co., Ltd.), and the like. The silica sol is available as Super Cera (the trade name of Daihachi Chemical Industry Co., Ltd.), Ceramica (the trade name of Nippon Sheet Glass Co., Ltd.), HAS (the trade name of Corcoat Co., Ltd.), Atolon SiN-500 (the trade name of Nippon Soda Co., Ltd.), CGS-DI-0600 (the trade name of Chisso Co., Ltd.), and the like.

The defogging coating of the present invention may contain at least one of gold, silver, copper, zinc, platinum, palladium, rhodium, vanadium, chromium, manganese, iron, cobalt, ruthenium, nickel, niobium, and tin (as the metal), and $SnO_2$, ZnO, $WO_3$ and ITO (as the electrically conductive metal oxide) as discussed above. The defogging coating containing the at least one of the above-listed metals and oxides is formed on the substrate by adding a solution containing a salt of at least one of the above-listed metals (the solution is prepared by dissolving the metal salt in water or organic solvent), a sol of at least one of the above-listed conductive metal oxides, and/or a colloid of at least one of the above-listed conductive metal oxides, to the titania sol to form a coating sol; and then the coating sol is coated on the surface of the substrate. Otherwise, the defogging coating containing the at least one of the above-listed metals and oxides is formed on the substrate by dipping the substrate into a solution containing a salt of at least one of the above-listed metals (the solution is prepared by dissolving the metal salt in water or organic solvent), a sol of at least one of the above-listed conductive metal oxides, and/or a colloid of at least one of the above-listed conductive metal oxides; and then by drying the substrate. Examples of the above salt of the metals are sulfate, nitrate, carbonate, ammonium salt, halide such as chloride and bromide, and organic salt such as stearate and acetate. These metal salts may be unhydrous salt or salt hydrate.

The defogging coating of the porous structure can be formed as follow: An organic polymer is added to a coating liquid containing the titania sol and $P_2O_5$, $B_2O_3$, boehmite, $\gamma$-$Al_2O_3$ and/or $SiO_2$—$Al_2O_3$ based oxide. The coating liquid (sol) is coated on the surface of the substrate and fired at 300° to 850° C. to form a porous defogging coating. Such a porous defogging coating can be improved in wettability to water and improved in quantum efficiency of photocatalyst function. Examples of the organic polymer are a water-soluble high polymer such as polyethylene glycol, and water-insoluble high polymer such as polytetrafluoroethylene (PTFE).

The manner of coating the coating liquid to form the defogging coating is suitably selected from known coating processes such as dip coating process, spin coating process, paint coating process, spray thermal deposition process.

EXPERIMENT

EVALUATION OF DEFOGGING ABILITY

The defogging ability of the defogging coating was evaluated by measuring a contact angle (the angle between the surface of water and the surface of the substrate) representing the wettability of the defogging coating. It is to be noted that the contact angle not more than 15° demonstrates a good defogging ability. If the contact angle increases 15°, the defogging ability tends to be degraded.

EVALUATION OF WEATHERABILITY

The weatherability of the defogging coating was evaluated by measuring the contact angle after an outdoor exposure test in which a specimen (the substrate with the defogging coating) was subjected to outdoor exposure upon being located facing the south and inclined an angle of 45°.

EXAMPLE 1

A clear float glass plate or substrate having a size of 100 mm×100 mm and a thickness of 2 mm was rinsed successively with neutral detergent, water and ethanol, and then dried thereby to prepare the substrate to be coated with the defogging coating. Titania sol and alumina sol were mixed at a predetermined mixing ratio to prepare a mixed sol. This mixed sol was coated on the surface of the substrate by dip coating process, and fired at 500° C. for 30 minutes after being air-dried, thus obtaining the defogging coating formed on the substrate. The defogging coating had a composition including 0.2 wt % of boehmite and 99.8 wt % of titania, in which the titania was of the anatase structure.

The defogging ability of the obtained defogging coating was evaluated, in which the initial contact angle was 3° thereby demonstrating a good defogging ability. Additionally, the contact angle was measured after the outdoor exposure test for six months, in which the contact angle was 9° so that the good defogging ability was maintained.

EXAMPLE 2

The procedure of Example 1 was repeated with the exception that the mixing ratio between the titania sol and the alumina sol was changed, thereby obtaining the defogging coating formed on the substrate. The obtained defogging coating had a composition including 25 wt % of boehmite and 75 wt % of titania, in which the titania was of the anatase structure.

The defogging ability of the obtained defogging coating was evaluated, in which the initial contact angle was 2° thereby demonstrating a good defogging ability. Additionally, the contact angle was measured after the outdoor exposure test for six months, in which the contact angle was 7° so that the good defogging ability was maintained.

EXAMPLE 3

The procedure of Example 1 was repeated with the exception that the mixing ratio between the titania sol and the alumina sol was changed, thereby obtaining the defogging coating formed on the substrate. The obtained defogging coating had a composition including 48 wt % of boehmite and 52 wt % of titania, in which the titania was of the anatase structure.

The defogging ability of the obtained defogging coating was evaluated, in which the initial contact angle was 1° thereby demonstrating a good defogging ability. Additionally, the contact angle was measured after the outdoor exposure test for six months, in which the contact angle was 7° so that the good defogging ability was maintained.

EXAMPLE 4

The procedure of Example 2 was repeated with the exception that the alumina sol was changed into phosphoric acid sol and the firing temperature was changed from 500° C. to 600° C., thereby obtaining the defogging coating formed on the substrate. The obtained defogging coating had a composition including 25 wt % of boehmite and 75 wt % of titania, in which the titania was of the anatase structure.

The defogging ability of the obtained defogging coating was evaluated, in which the initial contact angle was 2° thereby demonstrating a good defogging ability. Additionally, the contact angle was measured after the outdoor exposure test for six months, in which the contact angle was 8° so that the good defogging ability was maintained.

EXAMPLE 5

The procedure of Example 2 was repeated with the exception that the alumina sol was changed into boric acid sol and the firing temperature was changed from 500° C. to 600° C., thereby obtaining the defogging coating formed on the substrate. The obtained defogging coating had a composition including 25 wt % of $B_2O_3$ and 75 wt % of titania, in which the titania was of the anatase structure.

The defogging ability of the obtained defogging coating was evaluated, in which the initial contact angle was 2° hereby demonstrating a good defogging abilty. Additionally, the contact angle was measured after the outdoor exposure test for six months, in which the contact angle was 8° so that the good defogging ability was maintained.

EXAMPLE 6

The procedure of Example 2 was repeated with the exception that the clear float glass plate was replaced with a quartz glass plate and the firing temperature was changed from 500° C. to 800° C., thereby obtaining the defogging coating formed on the substrate. The obtained defogging coating had a composition including 25 wt % of γ-$Al_2O_3$ and 75 wt % of titania, in which the titania was of the anatase structure and the rutile structure.

The defogging ability of the obtained defogging coating was evaluated, in which the initial contact angle was 2° thereby demonstrating a good defogging ability. Additionally, the contact angle was measured after the outdoor exposure test for six months, in which the contact angle was 8° so that the good defogging ability was maintained.

EXAMPLE 7

The procedure of Example 2 was repeated with the exception that the alumina sol was replaced with $SiO_2$—$Al_2O_3$ based oxide sol (the oxide containing 17 wt % of $Al2O_3$) and the firing temperature was changed from 500° C. to 600°, thereby obtaining the defogging coating formed on the substrate. The obtained defogging coating had a composition including 25 wt % of $SiO_2$—$Al_2O_3$ based oxide (containing 17 wt % of $Al_2O_3$) and 75 wt % of titania, in which the titania was of the anatase structure.

The defogging ability of the obtained defogging coating was evaluated, in which the initial contact angle was 2° thereby demonstrating a good defogging ability. Additionally, the contact angle was measured after the outdoor exposure test for six months, in which the contact angle was 8° so that the good defogging ability was maintained.

EXAMPLE 8

The procedure of Example 2 was repeated with the exception that the alumina sol was replaced with $SiO_2$—$Al_2O_3$ based oxide sol (the oxide containing 38 wt % of $Al_2O_3$) and the firing temperature was changed from 500° C. to 600° C., thereby obtaining the defogging coating formed on the substrate. The obtained defogging coating had a composition including 25 wt % of $SiO_2$—$Al_2O_3$ based oxide (containing 38 wt % of $Al_2O_3$) and 75 wt % of titania, in which the titania was of the anatase structure.

The defogging ability of the obtained defogging coating was evaluated, in which the initial contact angle was 2° thereby demonstrating a good defogging ability. Additionally, the contact angle was measured after the outdoor exposure test for six months, in which the contact angle was 8° so that the good defogging ability was maintained.

EXAMPLE 9

The procedure of Example 2 was repeated with the exception that silica sol was coated on the glass plate (substrate) by the spin coating process and fired at 500° C. for 30 minutes after air-dried thereby to form a $SiO_2$ film as an intermediate layer to be located between the substrate and the defogging coating. The obtained defogging coating had a composition including 25 wt % of boehmite and 75 wt % of titania, in which the titania was of the anatase structure.

The defogging ability of the obtained defogging coating was evaluated, in which the initial contact angle was 2° thereby demonstrating a good defogging ability. Additionally, the contact angle was measured after the outdoor exposure test for six months, in which the contact angle was 8° so that the good defogging ability was maintained.

EXAMPLE 10

The procedure of Example 2 was repeated with the exception that the firing temperature was changed from 500° C. to 350° C., thereby obtaining the defogging coating formed on the substrate. The obtained defogging coating had a composition including 25 wt % of boehmite and 75 wt % of titania, in which the titania was of the anatase structure.

The defogging ability of the obtained defogging coating was evaluated, in which the initial contact angle was 2° thereby demonstrating a good defogging ability. Additionally, the contact angle was measured after the outdoor exposure test for six months, in which the contact angle was 10° so that the good defogging ability was maintained.

EXAMPLE 11

Titania sol and alumina sol were mixed in a predetermined mixing ratio thereby to prepare a mixed sol. A silver nitrate aqueous solution was added to the mixed sol thereby to form a coating liquid. This coating liquid was coated on the surface of the substrate by a dip coating process and fired at 350° C. for 30 minutes after being air-dried, thus obtaining a defogging coating. The obtained defogging coating had a composition including 25 wt % of boehmite and 75 wt % of titania, in which silver was dispersed in a matrix, and the titania was of the anatase structure.

The defogging ability of the obtained defogging coating was evaluated, in which the initial contact angle was 1° thereby demonstrating a good defogging ability. Additionally, the contact angle was measured after the outdoor exposure test for six months, in which the contact angle was 7 so that the good defogging ability was maintained.

EXAMPLE 12

The glass plate (substrate) coated with the defogging coating, produced by Example 2 was dipped in a 0.5 mol/l silver nitrate aqueous solution using a dip coating process, and then dried to obtain the defogging coating carrying silver. The obtained defogging coating had a composition including 25 wt % of boehmite and 75 wt % of titania, in which the titania was of the anatase structure.

The defogging ability of the obtained defogging coating was evaluated, in which the initial contact angle was 1° thereby demonstrating a good defogging ability. Additionally, the contact angle was measured after the outdoor exposure test for six months, in which the contact angle was 5° so that the good defogging ability was maintained.

EXAMPLE 13

Titania sol and alumina sol were mixed in a predetermined mixing ratio thereby to prepare a mixed sol. A polyethylene glycol was added to the mixed sol thereby to form a coating liquid. This coating liquid was coated on the surface of the substrate by a dip coating process and fired at 500° C. for 30 minutes after being air-dried, thus obtaining the defogging coating. The obtained defogging coating had a composition including 25 wt % of boehmite and 75 wt % of titania, the titania was of the anatase structure. Additionally, the defogging coating was porous because polyethylene glycol contained in the coating liquid burned to form pores in the defogging coating during firing.

The defogging ability of the obtained defogging coating was evaluated, in which the initial contact angle was 1° thereby demonstrating a good defogging ability. Additionally, the contact angle was measured after the outdoor exposure test for six months, in which the contact angle was 5° so that the good defogging ability was maintained.

COMPARATIVE EXAMPLE 1

The procedure of Example 1 was repeated with the exception that the mixing ratio between the titania sol and the alumina sol was changed, thereby obtaining the defogging coating formed on the substrate. The obtained defogging coating had a composition including 0.05 wt % of boehmite and 99.95 wt % of titania, in which the titania was of the anatase structure.

The defogging ability of the obtained defogging coating was evaluated, in which the initial contact angle was 3° thereby demonstrating a good defogging ability. Additionally, the contact angle was measured after the outdoor exposure test for six months, in which the contact angle was 20° so that the good defogging ability was lost.

COMPARATIVE EXAMPLE 2

The procedure of Example 1 was repeated with the exception that the mixing ratio between the titania sol and the alumina sol was changed, thereby obtaining the defogging coating formed on the substrate. The obtained defogging coating had a composition including 60 wt % of boehmite and 40 wt % of titania, in which the titania was of the anatase structure.

The defogging ability of the obtained defogging coating was evaluated, in which the initial contact angle was 3° thereby demonstrating a good defogging ability. Additionally, the contact angle was measured after the outdoor exposure test for six months, in which the contact angle was 20° so that the good defogging ability was lost.

COMPARATIVE EXAMPLE 3

The procedure of Example 1 was repeated with the exception that the firing temperature was changed from 500° C. to 200° C., thereby obtaining the defogging coating formed on the substrate. The obtained defogging coating had a composition including 25 wt % of boehmite and 75 wt % of titania, in which the titania was of the amorphous structure.

The defogging ability of the obtained defogging coating was evaluated, in which the initial contact angle was 2° thereby demonstrating a good defogging ability. Additionally, the contact angle was measured after the outdoor exposure test for six months, in which the contact angle was 20° so that the good defogging ability was lost.

COMPARATIVE EXAMPLE 4

The procedure of Example 6 was repeated with the exception that the firing temperature was changed from 800° to 950° C., thereby obtaining the defogging coating formed on the substrate. The obtained defogging coating had a composition including 25 wt % of γ-$Al_2O_3$ and 75 wt % of titania, in which the titania was of the rutile structure.

The defogging ability of the obtained defogging coating was evaluated, in which the initial contact angle was 8° thereby demonstrating a good defogging ability. Additionally, the contact angle was measured after the outdoor exposure test for six months, in which the contact angle was 25° so that the good defogging ability was lost.

COMPARATIVE EXAMPLE 5

The procedure of Example 2 was repeated with the exception that the alumina sol was replaced with $SiO_2$—$Al_2O_3$ based oxide sol (the oxide containing 10 wt % of $Al_2O_3$) and the firing temperature was changed from 500° C. to 600° C., thereby obtaining the defogging coating formed on the substrate. The obtained defogging coating had a composition including 25 wt % of $SiO_2$—$Al_2O_3$ based oxide (containing 10 wt % of $Al_2O_3$) and 75 wt % of titania, in which the titania was of the anatase structure.

The defogging ability of the obtained defogging coating was evaluated, in which the initial contact angle was 7° thereby demonstrating a good defogging ability. Additionally, the contact angle was measured after the outdoor exposure test for six months, in which the contact angle was 20° so that the good defogging ability was maintained.

COMPARATIVE EXAMPLE 6

The procedure of Example 2 was repeated with the exception that the alumina sol was replaced with $SiO_2$—$Al_2O_3$ based oxide sol (the oxide containing 50 wt % of $Al_2O_3$) and the firing temperature was changed from 500° C. to 600° C., thereby obtaining the defogging coating formed on the substrate. The obtained defogging coating had a composition including 25 wt % of $SiO_2$—$Al_2O_3$ based oxide (containing 50 wt % of $Al_2O_3$) and 75 wt % of titania, in which the titania was of the anatase structure.

The defogging ability of the obtained defogging coating was evaluated, in which the initial contact angle was 7° thereby demonstrating a good defogging ability. Additionally, the contact angle was measured after the outdoor exposure test for six months, in which the contact angle was 20° so that the good defogging ability was maintained.

The features of above-discussed Examples and Comparative Examples are summarized in Table 1 showing (a) existence or absence of the intermediate layer formed between the substrate and the defogging coating, (b) composition of the defogging coating, (c) existence or absence of the electrically conductive metal contained in or carried on the defogging coating, and (d) firing temperature of the defogging coating.

TABLE 1

| SAMPLE | INTER-MEDIATE LAYER | TITANIA (wt %) | BOEHMITE (wt %) | $P_2O_5$ (wt %) | $B_2O_3$ (wt %) | γ-$Al_2O_3$ (wt %) | $SiO_2$—$Al_2O_3$ BASED (wt %) | CONDUCTIVE METAL | FIRING TEMP. | NOTE |
|---|---|---|---|---|---|---|---|---|---|---|
| EXAMPLE 1 | Nil | 99.8 | 0.2 | 0 | 0 | 0 | 0 | Nil | 500° C. | |
| EXAMPLE 2 | Nil | 75 | 25 | 0 | 0 | 0 | 0 | Nil | 500° C. | |
| EXAMPLE 3 | Nil | 52 | 48 | 0 | 0 | 0 | 0 | Nil | 500° C. | |
| EXAMPLE 4 | Nil | 75 | 0 | 25 | 0 | 0 | 0 | Nil | 600° C. | |
| EXAMPLE 5 | Nil | 75 | 0 | 0 | 25 | 0 | 0 | Nil | 600° C. | |
| EXAMPLE 6 | Nil | 75 | 0 | 0 | 0 | 25 | 0 | Nil | 800° C. | |

TABLE 1-continued

| SAMPLE | INTER-MEDIATE LAYER | TITANIA (wt %) | BOEHMITE (wt %) | $P_2O_5$ (wt %) | $B_2O_3$ (wt %) | $\gamma$-$Al_2O_3$ (wt %) | $SiO_2$—$Al_2O_3$ BASED (wt %) | CONDUCTIVE METAL | FIRING TEMP. | NOTE |
|---|---|---|---|---|---|---|---|---|---|---|
| EXAMPLE 7 | Nil | 75 | 0 | 0 | 0 | 0 | 25(17 wt % $Al_2O_3$) | Nil | 600° C. | |
| EXAMPLE 8 | Nil | 75 | 0 | 0 | 0 | 0 | 25(38 wt % $Al_2O_3$) | Nil | 600° C. | |
| EXAMPLE 9 | $SiO_2$ | 75 | 25 | 0 | 0 | 0 | 0 | Nil | 500° C. | |
| EXAMPLE 10 | Nil | 75 | 25 | 0 | 0 | 0 | 0 | Nil | 350° C. | |
| EXAMPLE 11 | Nil | 75 | 25 | 0 | 0 | 0 | 0 | Ag CONTAINED | 350° C. | |
| EXAMPLE 12 | Nil | 75 | 25 | 0 | 0 | 0 | 0 | Ag CARRIED | 500° C. | |
| EXAMPLE 13 | Nil | 75 | 25 | 0 | 0 | 0 | 0 | Nil | 500° C. | POROUS FILM |
| COMPARATIVE EXAMPLE 1 | Nil | 99.95 | 0.05 | 0 | 0 | 0 | 0 | Nil | 500° C. | |
| COMPARATIVE EXAMPLE 2 | Nil | 40 | 60 | 0 | 0 | 0 | 0 | Nil | 500° C. | |
| COMPARATIVE EXAMPLE 3 | Nil | 75 | 25 | 0 | 0 | 0 | 0 | Nil | 200° C. | |
| COMPARATIVE EXAMPLE 4 | Nil | 75 | 0 | 0 | 25 | 25 | 0 | Nil | 950° C. | |
| COMPARATIVE EXAMPLE 5 | Nil | 75 | 0 | 0 | 0 | 0 | 25(10 wt % $Al_2O_3$) | Nil | 600° C. | |
| COMPARATIVE EXAMPLE 6 | Nil | 75 | 0 | 0 | 0 | 0 | 25(50 wt % $Al_2O_3$) | Nil | 600° C. | |

What is claimed is:

1. A defogging article comprising:
   a substrate; and
   a defogging coating formed on a surface of said substrate, said defogging coating including titania, and at least one oxide selected from the group consisting of $P_2O_5$, $B_2O_3$, boehmite, $\gamma$-$Al_2O_3$, and $SiO_2$—$Al_2O_3$ based oxide, said defogging coating containing said at least one oxide other than titania, in an amount ranging from 0.1 to 50% by weight, whereby a first surface of said defogging coating is exposed to and in direct contact with the air, and a second surface of said defogging coating that is opposite said first surface faces said substrate.

2. A defogging article as claimed in claim 1, wherein said $SiO_2$—$Al_2O_3$ based oxide contains $Al_2O_3$ in an amount ranging from 15 to 40% by weight.

3. A defogging article as claimed in claim 1, wherein said defogging coating includes at least one substance selected from the group consisting of metal and electrically conductive metal oxide, said at least one substance being contained in said defogging coating.

4. A defogging article as claimed in claim 1, wherein said defogging coating includes at least one substance selected from the group consisting of metal and electrically conductive metal oxide, said at least one substance being carried on a surface of said defogging coating.

5. A defogging article as claimed in claim 3, wherein said metal is at least one metal selected from the group consisting of at least one selected from the group consisting of gold, silver, copper, zinc, platinum, palladium, rhodium, vanadium, chromium, manganese, iron, cobalt, ruthenium, nickel, niobium and tin.

6. A defogging article as claimed in claim 3, wherein said electrically conductive metal oxide is at least one metal oxide selected from the group consisting of $SnO_2$, ZnO, $WO_3$ and ITO (indium-tin oxide).

7. A defogging article as claimed in claim 1, further comprising an intermediate layer disposed between said substrate and said defogging coating, said intermediate layer including at least one oxide selected from the group consisting of $SiO_2$, $TiO_2$, $ZrO_2$, $Al_2O_3$, $SnO_2$ nd ITO (indium-tin oxide) and ZnO.

8. A defogging article as claimed in claim 1, wherein said defogging coating includes at least one metal oxide selected from the group consisting of iron titanate, iron oxide, bismuth oxide, molybdenum oxide, nickel oxide, silica, yttrium oxide, manganese oxide, cobalt oxide, copper oxide, chromium oxide, and zirconium oxide.

9. A defogging glass plate comprising:
   a glass plate; and
   a defogging coating formed on a surface of said glass plate, said defogging coating including titania, and at least one oxide selected from the group consisting of $P_2O_5$, $B_2O_3$, boehmite, $\gamma$-$Al_2O_3$, and $SiO_2$—$Al_2O_3$ based oxide, said defogging coating containing said at least one oxide other than titania, in an amount ranging from 0.1 to 50% by weight, whereby a first surface of said defogging coating is exposed to and in direct contact with the air, and a second surface of said defogging coating that is opposite said first surface faces said glass plate.

10. A method of producing a defogging article as claimed in claim 1, comprising:
    coating a liquid containing titania and at least one compound which corresponds to at least one oxide selected from the group consisting of $P_2O_5$, $B_2O_5$, boehmite, $\gamma$-$Al_2O_3$ and $SiO_2$—$Al_2O_3$ a based oxide, upon being fired, on a surface of a substrate to form a coating layer, the liquid coating step including controlling the amount of said titania and said at least one compound such that said at least one oxide other than said titania is contained in a defogging coating in an amount of 0.1 to 50% by weight upon being fired; and
    firing said coating layer at a temperature ranging from 300° to 850° C. to form said defogging coating on the substrate.

11. A method of producing a defogging article as claims in claim 1, comprising:
    preparing a sol containing titania and at least one compound which corresponds to at least one oxide selected from the group consisting of $P_2O_5$, $B_2O_3$, boehmite, γ-$Al_2O_3$, and $SiO_2$—$Al_2O_3$ based oxide, upon being fired, said preparing including controlling the amount of said titania and said at least one compound such that said at least one oxide other than said titania is contained in a defogging coating in an amount of 0.1 to 50% by weight upon being fired;

coating said sol on a surface of a substrate; and firing said coating layer at a temperature ranging from 300° to 850° C. to form said defogging coating on the substrate.

12. A method as claimed in claim 11, further comprising the step of adding at least one organic polymer selected from the group consisting of polyethylene glycol and polytetrafluoroethylene to said sol.

13. A method of producing a defogging glass plate as claimed in claim 9, comprising:

coating a liquid containing titania and at least one compound which corresponds to at least one oxide selected from the group consisting of $P_2O_5$, $B_2O_3$, boehmite, γ-$Al_2O_3$, and $SiO_2$—$Al_2O_3$ based oxide upon being fired, on a surface of a glass plate to form a coating layer, the liquid coating steps including controlling the amount of said titania and said at least one compound such that said at least one oxide other than said titania is contained in a defogging coating in an amount of 0.1 to 50% by weight upon being fired; and firing said coating layer at a temperature ranging from 300° to 850° C. to form said defogging coating on the substrate.

* * * * *